United States Patent [19]

Kuenzel

[11] 4,399,330

[45] Aug. 16, 1983

[54] COMMUNICATIONS SYSTEM, IN PARTICULAR A TELEPHONE SYSTEM, FOR CONNECTING MOBILE SUBSCRIBER TERMINAL DEVICES

[75] Inventor: Roland Kuenzel, Puchheim, Fed. Rep. of Germany

[73] Assignee: Siemens Aktiengesellschaft, Berlin & Munich, Fed. Rep. of Germany

[21] Appl. No.: 291,018

[22] Filed: Aug. 7, 1981

[30] Foreign Application Priority Data

Sep. 10, 1980 [DE] Fed. Rep. of Germany ....... 3034066

[51] Int. Cl.³ ............................................. G11B 13/00
[52] U.S. Cl. .............................. 179/2 EB; 340/825.49; 455/56
[58] Field of Search .......................... 174/2 EA, 2 EB; 340/825.49, 825.31; 455/54, 56

[56] References Cited

U.S. PATENT DOCUMENTS

| 3,573,739 | 4/1971 | Zeitlin | 340/825.49 |
| 4,178,476 | 12/1979 | Frost | 340/825.49 |
| 4,187,398 | 2/1980 | Stark | 179/2 EB |
| 4,254,404 | 3/1981 | White | 455/56 |

FOREIGN PATENT DOCUMENTS 2426875 12/1975 France ........................... 340/825.49

52-49985 11/1978 Japan ................................. 455/56
56-40335 4/1981 Japan ................................. 455/56

OTHER PUBLICATIONS

Monk, N., "Experimental Radio-Telephone . . . ", Proceedings of IEEE, 1951, Aug., pp. 873-881.

*Primary Examiner*—G. Z. Rubinson
*Assistant Examiner*—L. C. Schroeder
*Attorney, Agent, or Firm*—Hill, Van Santen, Steadman & Simpson

[57] ABSTRACT

A communications system, in particular a telephone system, is provided for the connection of mobile subscriber terminal devices via radio links, in which a central and/or sub-central location there are arranged storage devices which, for all of the users, each store an item of information concerning the relevant location of a user. The particular stored item of location information is used to control the switch-through of a connection to be established to the mobile user. The subscriber terminal devices include identification read-out devices for reading user identification cards. The subscriber terminal device temporarily receives the user call code stored on the user identification card which provides the facility of passive access to the user. Facilities are also provided for automatic charge accounting.

14 Claims, 4 Drawing Figures

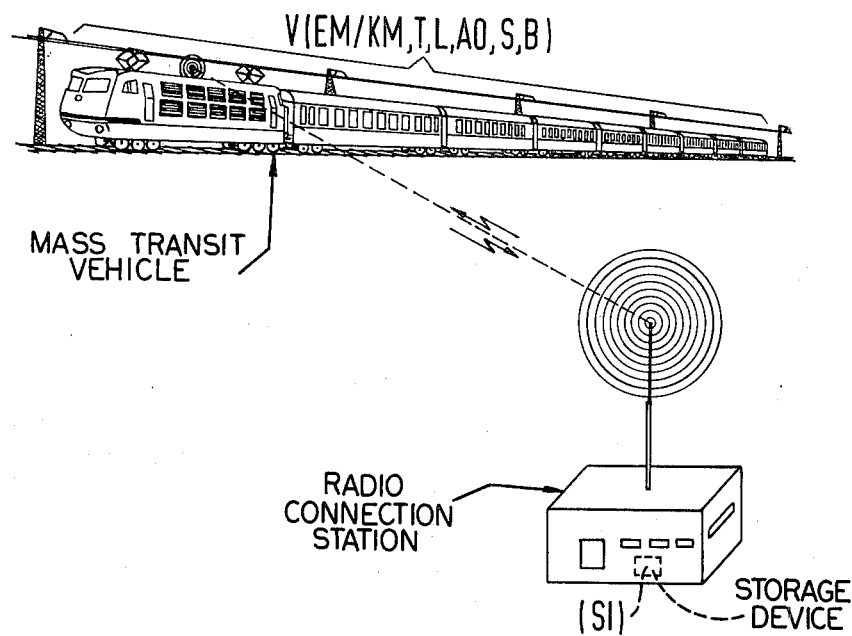
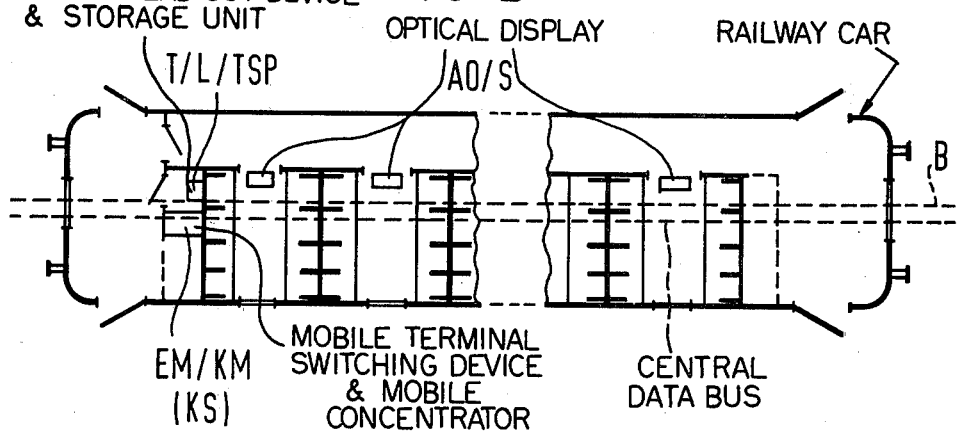

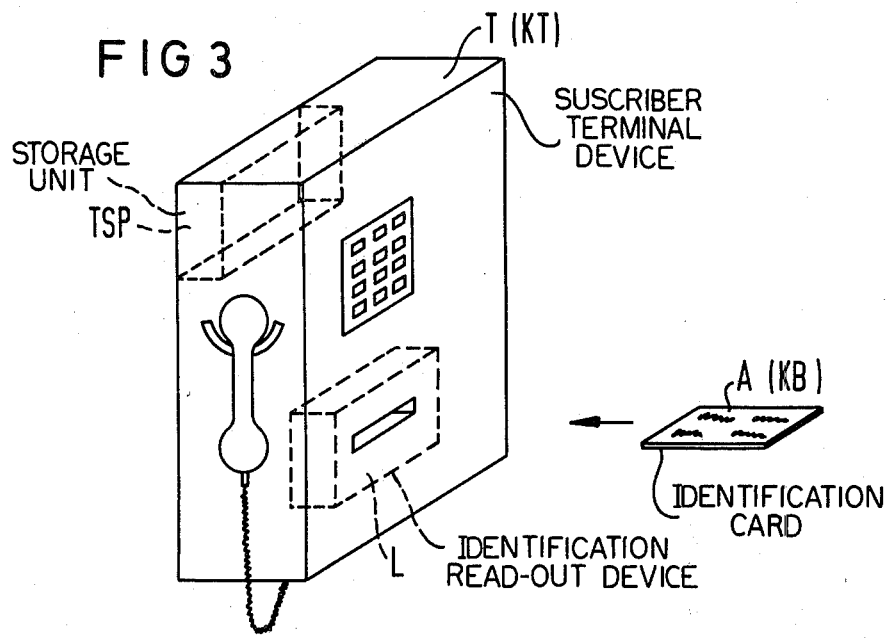
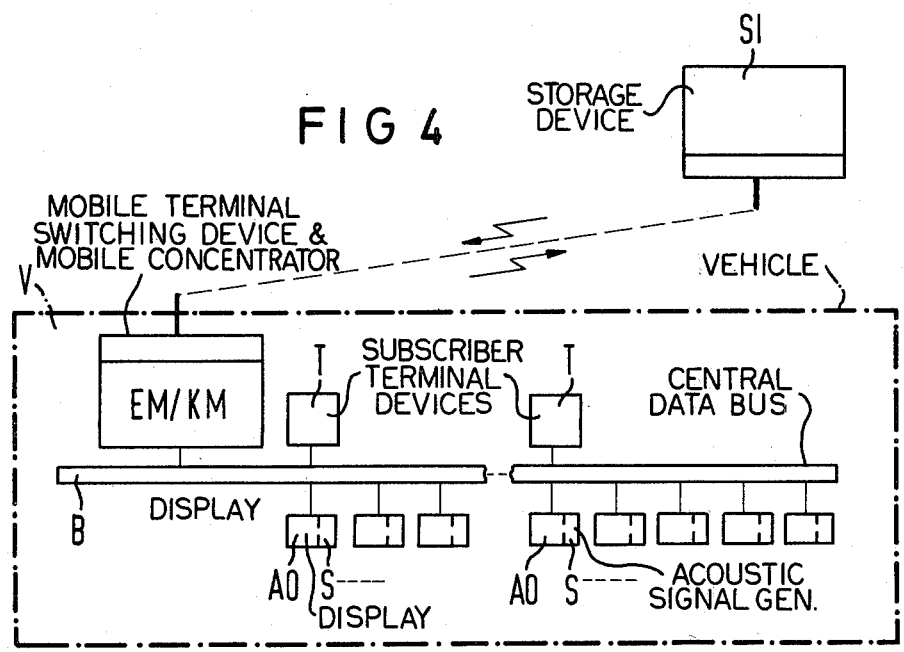

COMMUNICATIONS SYSTEM, IN PARTICULAR A TELEPHONE SYSTEM, FOR CONNECTING MOBILE SUBSCRIBER TERMINAL DEVICES

BACKGROUND OF THE INVENTION

1. Field of the Invention

The present invention relates to a communications system in particular a telephone system, for connecting mobile subscriber terminal devices, and is more particularly concerned with the connection of the mobile subscriber terminal devices via radio connections, wherein, at a central and/or a sub-central location, there are arranged storage devices which, for all users, each have stored an item of information concerning the relevant location of a user, and wherein the stored item of location information in question is used to control the switching through of a connection which is to be established to the mobile user in question.

2. Description of the Prior Art

In conveyance systems, for example mass transit systems such as railroads, ships, overland buses, aircraft and the like, subscriber terminal devices, for example telephone stations, are required both for operational purposes and for the conveyance of passengers. Separate systems for user devices for the operating personnel on the one hand, and for the passengers who are to be transported, on the other hand, amount to a multiple expense with respect to supplies, space, administration and servicing of such devices. Moreover, the loading of such systems generally is not optimum. A substantial increase in the use facilities and the user comfort would avoid, on the one hand, the technical and operational disadvantages of separate systems and, on the other hand, would also offer a high degree of comfort for private users. This comfort could consist, for example, in the possibility of automatic call establishment from a traveler to a remote subscriber, or vice-versa, and, for example, the possibility of non-cash charge input.

SUMMARY OF THE INVENTION

The object of the present invention is to provide a communications system by way of which both the operating personnel of a mass transit vehicle and also the passengers who are to be transported can use incoming and outgoing communications connections, in particular telephone connections. Furthermore, the object of the invention includes facilitation of non-cash charge input for the use of the communications system. A further object of the invention is that the users of the communications system can establish communication connections from one or more arbitrary members of the plurality of subscriber terminal devices which can be installed in a mass transit vehicle, or can enter into incoming communications.

In order to realize the above objects, a communications system, in particular a telephone system, is proposed for connecting mobile subscriber terminal devices, in particular mobile subscriber terminal devices connected via radio connections, wherein at a central and/or a sub-central location, there are arranged storage devices which, for all of the users, each have stored an item of information concerning the relevant location of a user and wherein the particular stored item of location information is used to control the switch-through of a connection to be established to the mobile user in question. The proposed communications system is characterized, according to the present invention, in that a mobile terminal switching device or a mobile concentrator is provided for establishing and disconnecting connections, for the storage and preliminary processing of switching technology data, and for the combined execution of organization functions such as, for example, transfer functions, for a plurality of subscriber terminal devices which fundamentally enjoy equal priority, and are installed in a conveyance composed of at least one unit, for example, a rail-based mass transit vehicle. Each subscriber terminal device has provided therein an identification read-out device which makes it possible to read a user identification which is available to the individual user and which contains at least one item of information relating to a user call code. The subscriber terminal device is assigned the user call code assigned to the user identification in question where a plurality of user identifications can be input and where the subscriber terminal device can also be permanently assigned an individual subscriber terminal device call code. An optical display is provided which can be accompanied by acoustic signal generators which are in each case arranged in a subscriber terminal device and/or at the place of sojourn of the user.

The present invention offers the advantage that a standard system is available for use by the operating personnel and by the passengers who are to be transported, wherein particular user comfort is provided in that the users can employ, in the outgoing and incoming direction, anyone of the plurality of subscriber terminal devices installed in a mass transit vehicle, and that non-cash charge input is facilitated by an automatic accounting process employing data stored on the user identification, which may be a card.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic perspective view of a mass transit vehicle V, for example a railway train, and a land-base, central or sub-central radio connection station having a storage device SI which is likewise illustrated schematically;

FIG. 2 schematically illustrates, in a open plan view, a unit of the vehicle V of FIG. 1, that is a railway car, showing installation points of various mobile components of the communications system;

FIG. 3 is a perspective view of the subscriber terminal device T having an identification read-out device L, likewise illustrated schematically, and having a terminal device storage unit TSP and a user identification card A which is to be inserted into the identification read-out device L; and FIG. 4 is a block circuit diagram of an exemplary embodiment of that component which is essential to the invention of the communication system, comprising a central data bus B, a mobile terminal switching device EM and a mobile concentrator KM, a plurality of subscriber terminal devices T, a plurality of optical displays AO each accompanied by acoustic signal generators S, and a central or sub-central, land-based storage device SI which is connected via a radio link.

DESCRIPTION OF THE PREFERRED EMBODIMENTS

As already explained above, FIG. 1 illustrates, in a schematic perspective view, a mass transit vehicle V, namely a railway train, and a land-base, central or sub-central radio connection station having a likewise schematically illustrated storage device SI. Again, as mentioned above, FIG. 2 schematically illustrates, in an open plan view, a unit of the vehicle V, namely a railway car, indicating installation points of various mobile components of the communications system. These components comprise a mobile terminal switching device EM and a mobile concentrator KM. A subscriber terminal device T has installed therein an identification read-out device L and a terminal device storage unit TSP. A plurality of optical displays AO are installed in the railway car compartment, preferably above the door to the corridor and each preferably assigned an acoustic signal generator S. As can be seen from FIG. 2, the central data bus B extends in the longitudinal direction of the railway car and is arranged so as to be able to be extended beyond the ends of the car so that corresponding mobile devices can be connected, in the illustrated manner, in other cars of the train. The mobile terminal switching device EM and the mobile concentrator KM are generally provided only once, in respect of each vehicle V and can be accommodated at a suitable position, preferably in the engine. As can be seen, more optical displays AO, together with their acoustic signal generators S, are provided than subscriber terminal devices T. Generally speaking, the installation of a single subscriber terminal device in a railway car of conventional construction and size should be adequate. The subscriber terminal device T is advantageously installed, for example, in the region of the corridor or in the region of the railway car doors. The optical displays AO with the accompanying acoustic signal generators S are preferably arranged in the compartment for reasons of comfort. Their function is to arouse the attention of the travelers and to indicate thereto that a communication request exists and to indicate for which of the travelers the call is intended.

The mobile terminal switching device EM and the mobile concentrator KM serve to establish and disconnect connections, to store and preliminarily process items of switching data, and for the combined execution of organization functions such as, for example, transfer functions, for a plurality of subscriber terminal devices which fundamentally enjoy equal priority and are installed in a vehicle V which comprises at least one unit. Instead of a railway train, as indicated in the present exemplary embodiment, the conveyance V can also, of course, comprise a ship, an aircraft, an overland bus or the like. In accordance with the invention, each of the installed subscriber terminal devices T comprises an identification read-out device L (FIG. 3) into which a user identification card A can be inserted through a slot provided in the housing wall of the subscriber terminal device. The user identification card A bears at least one item of information which relates to a user call code KB which can be read by the identification read-out device L. The user identification card A can comprise a magnetic data carrier, but it could also comprise a holographic data carrier. Furthermore, as known per se, it is also possible to design the user identification card A as a data carrier which has a structured surface, in which case the information is contained in the surface structure. The subscriber terminal device T, into whose identification read-out device L a user identification card A is inserted, automatically accepts the user code KB which is assigned to the user identification card A in question. However, in accordance with the invention, a plurality of user identification cards A can be input into the subscriber terminal device T. The subscriber terminal device T also includes its own individual subscriber terminal device call code KT which can be permanently assigned to this subscriber terminal device T. The input user call code KB is transmitted to a terminal device storage unit TSP individually assigned to the subscriber terminal device T, where the same is stored. As also illustrated in the exemplary embodiment shown in FIG. 3, the terminal device storage unit TSP is preferably installed in the subscriber terminal device T. The input user call code KB, preferably together with a location code KS, assigned to the location of the identification read-out device L being used, is transmitted to a central or sub-central, land-based storage device SI which communicates with the vehicle V via a radio link, where such information are stored. At the same time these two codes are also transmitted to the mobile terminal switching device EM assigned to the vehicle V in question, and to the mobile concentrator KM where they are likewise stored. However, a mode of operation is possible in which these two codes are transmitted exclusively to the mobile terminal switching device EM or to the mobile concentrator KM. The location code KS can also be selectively determined the identification of the data source in question and, together with the user call code KB, can be stored in the central or sub-central, land-based storage device SI and/or in the mobile terminal switching device EM assigned to the vehicle V or in the mobile concentrator KM.

Once a location code KS has been input, it can be automatically overwritten in the storage positions in question by a new location code KS, in that the information content of the user identification card is input into another identification read-out device L. In this case, the central or sub-central, land-based storage device SI or the mobile terminal switching device EM assigned to the vehicle V or the mobile concentrator KM transmit an erasing command either to the mobile terminal switching device EM, the mobile concentrator KM or to the relevant terminal device storage unit TSP, whereby the location code KS is erased together with the user call code KB or else only the user call code KB is erased. An assignment of the user call code KB to the relevant subscriber terminal device T which has been effective by the storage of the user call code KB in that storage position within the storage device SI assigned to the subscriber terminal device T, possibly even in the subscriber terminal device T itself, is canceled in that the storage contents in question is erased by a control procedure at the subscriber terminal device T. This assignment can also be automatically canceled in that an item of information which has been previously input at the time of the input process and which characterizes the arrival time is used to form a difference with an item of information corresponding to the current time and in the event of identity or a positive difference, an erasing criterion is obtained by means of which an erasing process is initiated. The function of both erasing processes is to cancel the aforementioned assignment when the user in question has left the vehicle. A general erasure is also possible in that all of the user call codes KB in all the storage devices assigned to the vehicle V are automatically erased in that when the vehicle V has reached its end station, a control procedure is implemented at a control point provided for this purpose. An advantageous further development of the invention provides that the assignment of the user call code KB to the relevant subscriber terminal device T which has been effected by the storage of the user call code KB in that storage position in the storage device SI assigned to the subscriber terminal device T, possibly even in the subscriber terminal device T itself, is automatically canceled in that an item of information which has been previously input at the time of the input process and which characterizes the target station is used to effect a comparison with an item of information which corresponds to the target station which has been reached and which has been automatically or manually input into the communications systems, and in the event of the identity of the two items of information an erasing criterion may be formed by means of which an erasing process is initiated.

In accordance with a further development of the invention, the user call code KB which has been input can be additionally stored in the subscriber terminal device T and can be used to effect user-related switching and/or checking procedures. As a rule, the user call code KB is assigned exclusively to a single user identification card A. Moreover, in accordance with a further development of the invention, it is advantageous to assign the user call code KB exclusively to the user identification card A, thus facilitating a relatively simple administration of the user call code KB.

An advantageous further development of the invention provides that specific operators of the vehicle V or persons having specific functions have priority access to the communication system in that a priority code is stored on the user identification card A, which priority code can be read by the identification read-out device L and by means of which the priority control unit in the communications system can be activated.

In the event that the vehicle V comprises a plurality of units, for example a plurality of railway cars, these units can be connected to one another in order that all of the subscriber terminal devices may be connected to the mobile terminal switching device EM or the mobile concentrator KM via the central data bus B illustrated in FIG. 4.

The method of installing the various mobile devices of the communications system illustrated in FIG. 2 is particularly advantageous as, on the one hand, telephone conversations are generally of a private confidential nature and, on the other hand, other travelers could suffer disturbance if a subscriber terminal device were accommodated, for example, in each compartment. However, it is advantageous to install optical displays AO with the accompanying acoustic signal generators S in all of the compartments of a car or at a plurality of locations of a dining car, should this be provided, and if necessary in the laboratories of the car.

The proposed communications system has the advantage that the users of this system can be charged without the use of cash by means of the user identification cards. A further advantage of the communications system, according to the present invention, is that each traveler who so desires and who is in possession of the user identification card, can be passively reached at any time in the vehicle in question, provided he has inserted his user identification card in one of the identification readout devices. Therefore, it is also possible to establish an incoming connection to the subscriber in a mass transit vehicle.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A communications system comprising:
   a vehicle;
   a stationary station, including location storage means for a plurality of users;
   radio connection means in said vehicle for establishing radio connections with said stationary station;
   at least one subscriber terminal in said vehicle, assigned a terminal call code, for radio/telephone communications via said radio connection means and said stationary station, including an identification reading device, means for storing a user code, and means for transmitting a user code and a location code to said storage means of said stationary station, and
   at least one display and corresponding acoustic signal generator in said vehicle connected to said terminal and operable to alert a user of an incoming call.

2. The system of claim 1, and further comprising:
   a plurality of said display and acoustic signal generator combinations assigned to respective users.

3. The system of claim 1, and further comprising:
   means for overwriting the location code with a new location code by inserting an identification card into a different one of said identification reading devices, said radio connection device responsive to reading of the user call code to emit an erasure signal to erase at least the previously stored user call code.

4. The system of claim 1, wherein:
   the subscriber terminal includes means responsive to a user call code to transmit an erasure signal to said location storage means.

5. The system of claim 1, and further comprising:
   means for comparing a previously input item of information characterizing arrival time with an item of information characterizing current time and responsive to equality or to a positive difference to emit an erasure signal.

6. The system of claim 1, and further comprising:
   means for erasing all stored codes when the vehicle reaches its destination.

7. The system of claim 1, and further comprising:
   means for comparing a previously input item of information characterizing a target station with an item of information characterizing reaching the target station and responsive to equality to emit an erasure signal.

8. The system of claim 1, and further comprising:
   means responsive to a stored user call code to implement predetermined switching procedures.

9. The system of claim 1, and further comprising:
   a respective user call code; and
   a single identification card bearing the assigned call code.

10. The system of claim 9, wherein:
    said user call code comprises a priority code.

11. The system of claim 9, wherein:

said user call code is a magnetic code and said card is a magnetic code card.

12. The system of claim 9, wherein:

said card is a holographic card.

13. The system of claim 9, wherein:

said card comprises a structured surface defining said user call code.

14. The system of claim 1, wherein:

said vehicle comprises a plurality of units; and said units are connected via a common data bus for interconnection of said radio connection means, said subscriber terminals and said displays and acoustic signal generators.

* * * * *